(12) United States Patent
Hsiu

(10) Patent No.: US 6,711,781 B2
(45) Date of Patent: Mar. 30, 2004

(54) AUTOMATIC RELEASING HINGE

(75) Inventor: Lee Jung Hsiu, Taipei (TW)

(73) Assignee: Lite-On Technology Corporation (TW)

( * ) Notice: Subject to any disclaimer, the term of this patent is extended or adjusted under 35 U.S.C. 154(b) by 0 days.

(21) Appl. No.: 10/224,515

(22) Filed: Aug. 21, 2002

(65) Prior Publication Data

US 2004/0034967 A1 Feb. 26, 2004

(51) Int. Cl.[7] .............................................. E05D 11/08
(52) U.S. Cl. .............................. 16/342; 16/266; 16/330
(58) Field of Search ......................... 16/342, 334, 330, 16/303, 332, 266, 267, 386, 269, 260; 379/433.01, 433.05, 433.13; 361/680–683; 403/84, 383, 361, 375

(56) References Cited

U.S. PATENT DOCUMENTS

| | | | | |
|---|---|---|---|---|
| 5,109,572 A | * | 5/1992 | Park ............................ | 16/334 |
| 5,645,308 A | * | 7/1997 | Fink ........................... | 296/97.9 |
| 5,678,206 A | * | 10/1997 | Ishii .......................... | 455/575.8 |
| 5,715,576 A | * | 2/1998 | Liu ............................. | 16/342 |
| 5,905,796 A | * | 5/1999 | Jung ...................... | 379/433.13 |
| 6,101,676 A | * | 8/2000 | Wahl et al. .................... | 16/342 |
| 6,308,377 B1 | * | 10/2001 | Maatta ......................... | 16/341 |

FOREIGN PATENT DOCUMENTS

| | | | | |
|---|---|---|---|---|
| JP | 2-54214 | * | 2/1900 | |
| JP | 2002-89538 A | * | 3/2002 | |

* cited by examiner

*Primary Examiner*—Chuck Y. Mah
(74) *Attorney, Agent, or Firm*—Bacon & Thomas, PLLC (57) ABSTRACT

An automatic releasing hinge. The hinge enables a device to be turned under an external force, and to be automatically released when a turning angle exceeds a selected limit so that the device may be prevented from becoming damaged when being turned by a force beyond a normal range.

4 Claims, 8 Drawing Sheets

AUTOMATIC RELEASING HINGE

BACKGROUND OF THE INVENTION

1. Field of the Invention

The invention relates to an automatic releasing hinge that enables a pintle hub disengaging automatically from a connecting section when being turned outside the normal range to avoid damages.

2. Description of the Prior Art

Hinges are commonly used apparatus for turning. For instance, personal digital assistance (PDAs), notebook computers, handsets, and face panels of many devices have hinges to perform turning, supporting and anchoring functions. However, conventional hinges are easily damaged when being forced to turn beyond their normal utilization ranges. The invention aims at providing an improved hinge that is capable of releasing automatically at the connecting section when the turning angle exceeds a selected value resulting from inadvertent operations so that the device where the hinge is installed may be prevented from damaging.

SUMMARY OF THE INVENTION

The primary object of the invention is to provide an automatic releasing hinge to resolve the disadvantages set forth above. The hinge according to the invention automatically disengages and releases at the connecting section when being turned beyond the normal range, thus the object being mounted may be prevented from damaging and the appearance may be maintained intact.

Another object of the invention is to provide an automatic releasing hinge that is simply structured with a smaller number of elements and easy to assemble so that users may assemble and repair by themselves.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
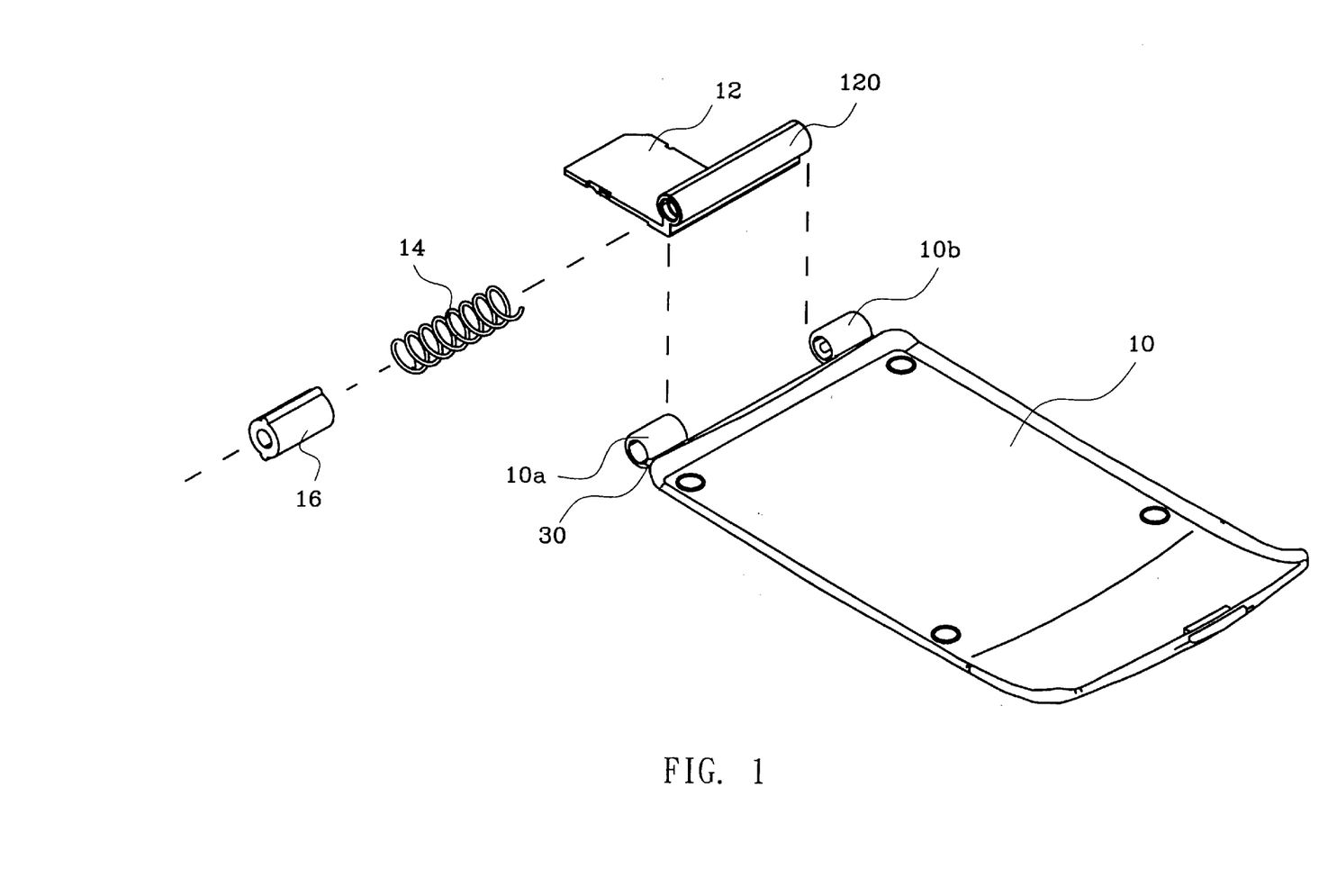
FIG. 1 is an exploded view of an embodiment of the invention.

Refer to FIG. 1 for an embodiment of the invention. The hinge of the invention includes an upper lid 10 and a lower lid 12. The upper lid 10 has a first bushing 10a and a second bushing 10b. The lower lid 12 has a barrel 120 which may be coupled with the first bushing 10a and the second bushing 10b to enable the upper lid 10 and the lower lid 12 to form a turning relationship. The barrel 120 further houses an elastic element 14 and a pintle hub 16 therein to perform automatic releasing function. The picture shown in FIG. 1 is only an embodiment for reference. Other shapes and forms may be adopted and function equally well.

Figures 2A, 2B:
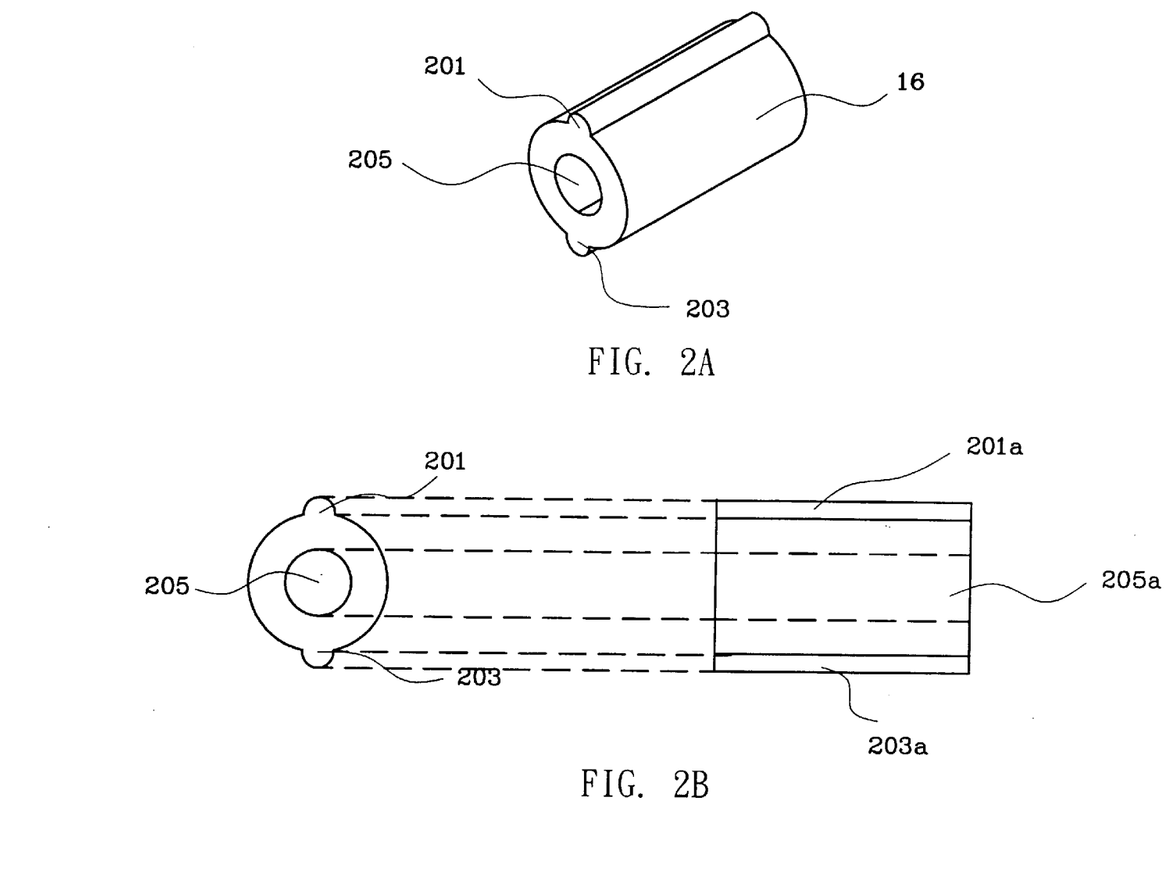
FIG. 2A is a prospective view of an embodiment of a pintle hub of the invention.
FIG. 2B is a side view of the pintle hub of the invention.

Referring to FIG. 2A, the pintle hub 16 includes a center spindle 205, a first anchor ridge 201 and a second anchor ridge 203. The center spindle 205 is hollow for coupling with an axle 35, of the bushing shown in FIG. 3B for turning purpose (which will be described later). The first anchor ridge 201 and the second anchor ridge 203 are jutting outside the periphery of the cylindrical pintle hub 16 to perform turning, latching and releasing functions. Referring to FIG. 2B, the first anchor ridge 201 has a corresponding first anchor side 201a while the second anchor ridge 203 has a corresponding anchor side 203a, and the center spindle 205 has a spindle side 205a.

Figure 3A:
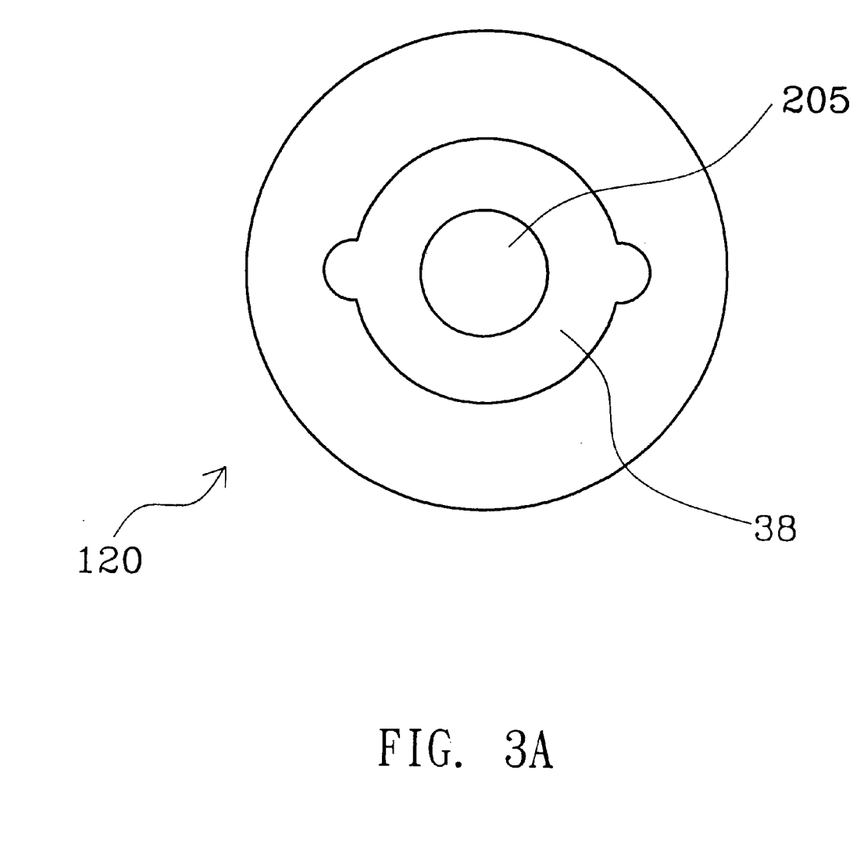
FIG. 3A is a sectional view of an embodiment of a barrel of the invention.

Refer to FIG. 3A for the barrel of the invention. The hub trough 38 is a latch trough firmly engaged with the pintle hub 16 to enable the lower lid 12 be driven and turned by the pintle hub 16.

Figure 3B:
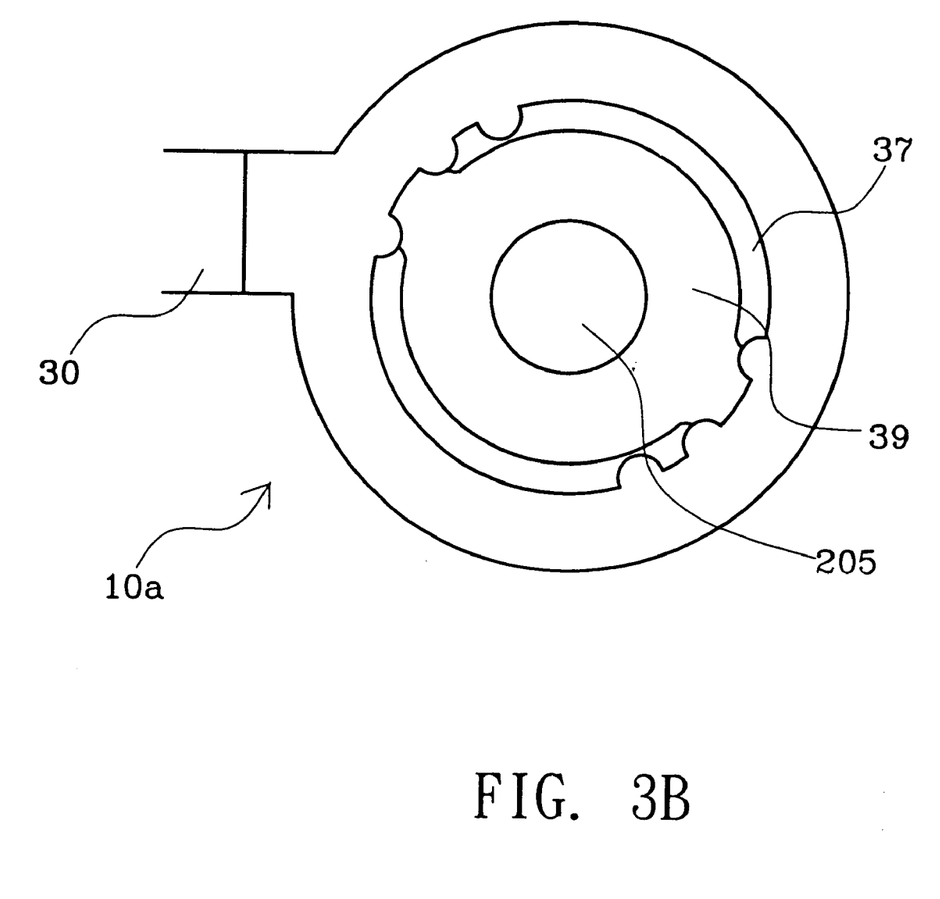
FIG. 3B is a sectional view of an embodiment of a bushing of the invention.

Referr to FIG. 3B for the bushing of the invention. The first bushing 10a and the second bushing 10b of the upper lid 10 connect to the lower lid 12 through the pintle hub 16 coupled in the barrel 120, and is turnable relative to the barrel 120. The first bushing 10a connects to the upper lid 10 through a connecting section 30, and the pintle hub 16 is coupled in the first bushing 10a. The turning ridge 37 presses the first anchor ridge 201 and the second anchor ridge 203 of the pintle hub 16 to prevent it from releasing. When the pintle hub 16 is turned to the release trough 39 as shown in FIG. 3B, it is at a released position. Details will be discussed later by referring to FIGS. 3C and 3D.

Figure 3C:
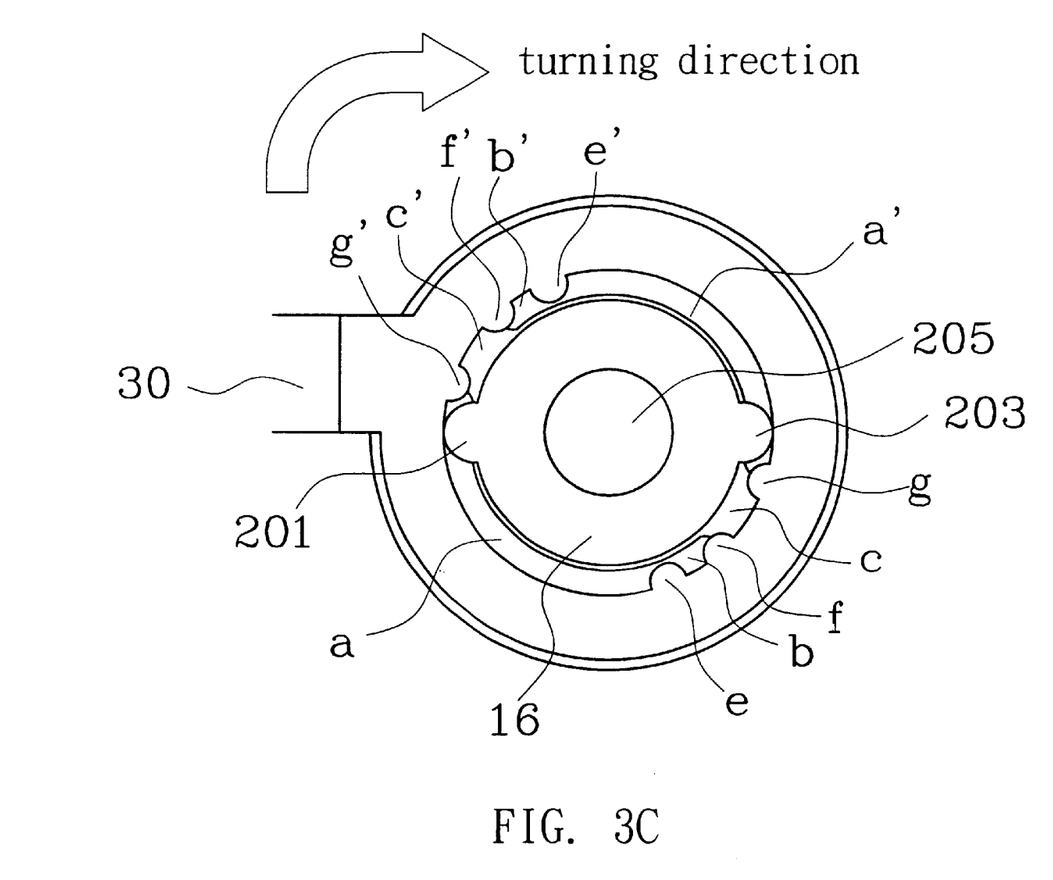
FIG. 3C is a schematic view of the pintle hub in a turning condition.

Refer to FIG. 3C for the pintle hub at the turning position. It is a schematic view done by overlapping FIG. 3A and FIG. 3B. When the device is turned in the clockwise direction from the initial position, the first anchor ridge 201 and the second anchor ridge 203 of the pintle hub 16 are turned respectively in a first turning trough a and a second turning trough a'. In other words, the first turning trough a and the second turning trough a' form a free turning space. The device has a connecting section 30 located on the lower lid 12 shown in FIG. 1. Thus the lower lid and the connecting section 30 can move the barrel 120 to turn freely in the free turning space.

Figure 3D:
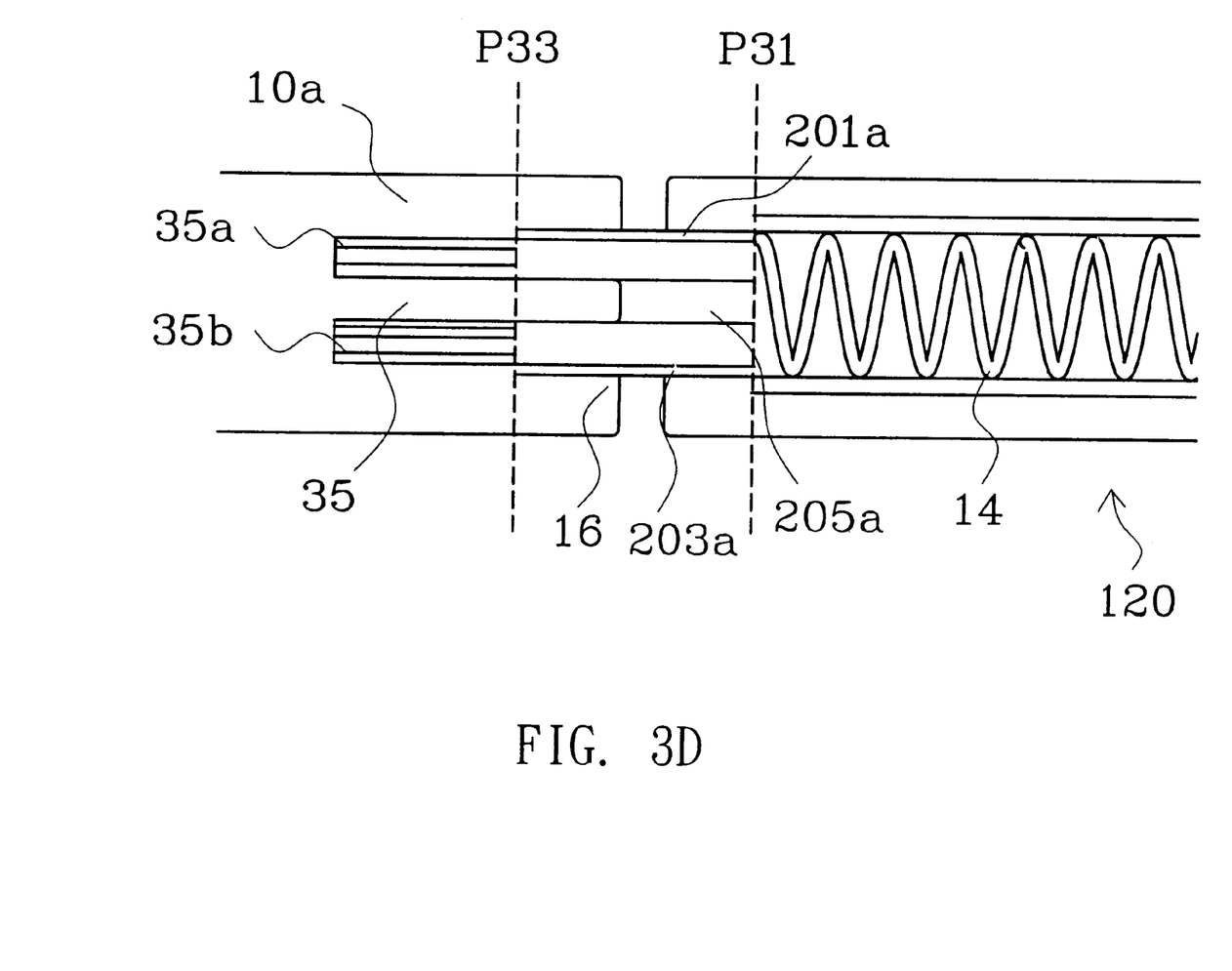
FIG. 3D is a side view of the pintle hub in a turning condition.

Refer to FIG. 3D for the pintle hub at the turning position. When the pintle hub 16 is turned freely in the free turning space (as shown in FIG. 3A), the elastic element 14 located in the barrel 120 has one end forming a first position P31 while the pintle hub 16 has one end located in the first bushing 10a to become a first pintle hub position P33. The first anchor side 201a and the second anchor side 203a are wedged in a first bushing space 35a and a second bushing space 35b formed on the periphery of the axle 35 without escaping.

Figure 4:
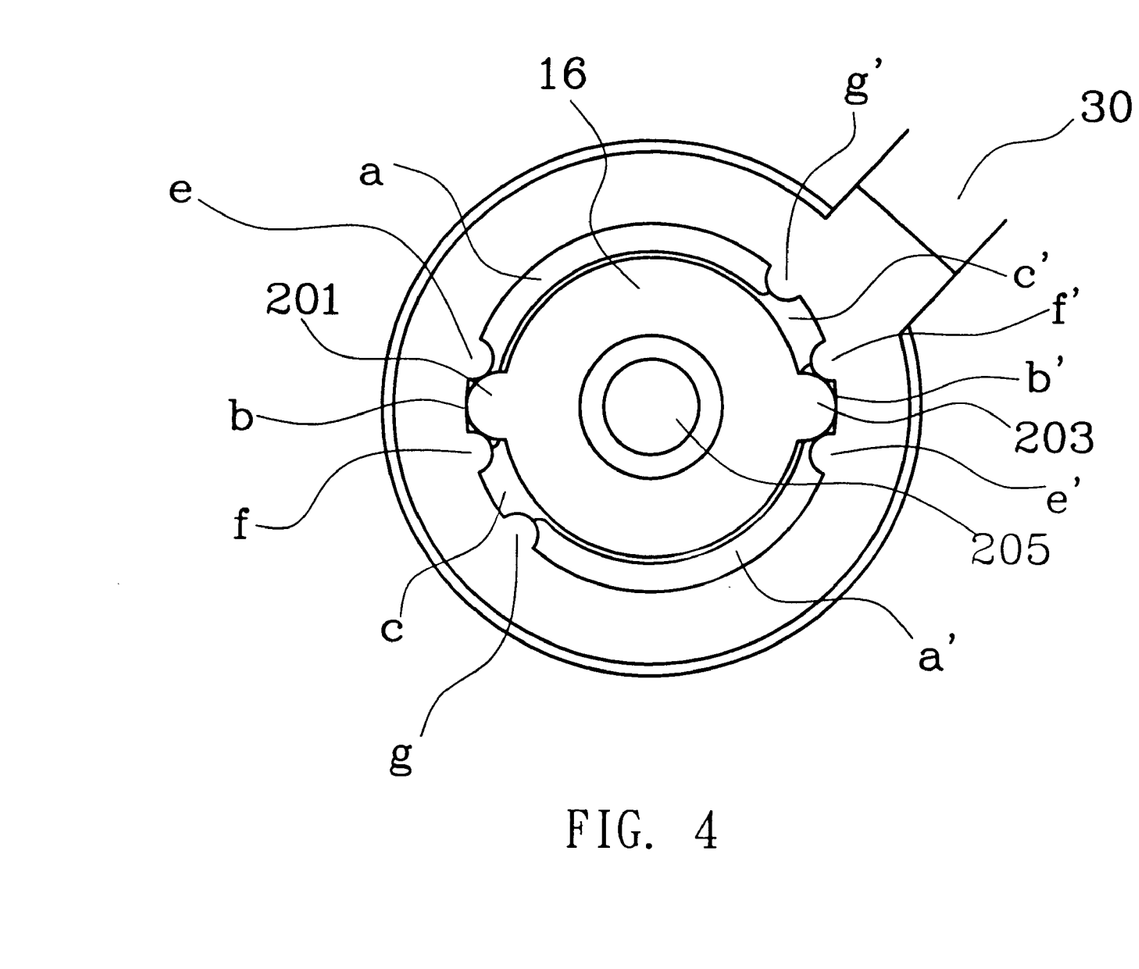
FIG. 4 is a schematic view of the pintle hub in an anchor condition.

Referring to FIG. 4, when the device is turned with the connecting section 30, the first anchor ridge 201 of the pintle hub 16 passes over a first hump e and is stopped by a third hump f and is wedged in a first anchor trough b, while the second anchor ridge 203 passes over a second hump e' and is stopped by a fourth hump f' and is wedged in a second anchor trough b'. As two ends of the pintle hub 16 are wedged in the anchor troughs, the device is at an anchor position.

Figure 5A:
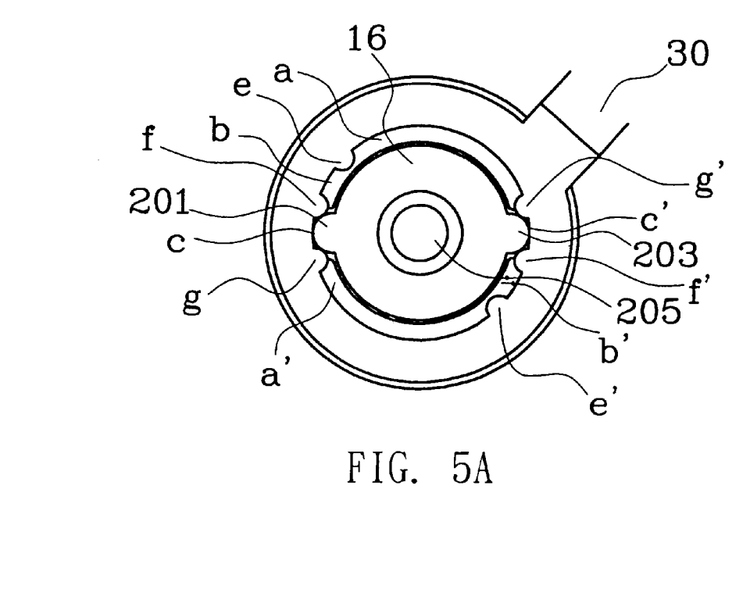
FIG. 5A is a schematic view of the pintle hub in a released condition.

Referring to FIG. 5A, when the device is turned continuously with the connecting section 30, the first anchor ridge 201 of the pintle hub 16 passes over the hump f and is stopped by a fifth hump g and is wedged in a first release trough c, while the second anchor ridge 203 passes over the fourth hump f' and is stopped by a sixth hump g' and is wedged in a second release trough c'. The two ends of the pintle hub 16 are wedged in the release troughs, the device is at a release position (also referring to FIG. 5B).

Figure 5B:
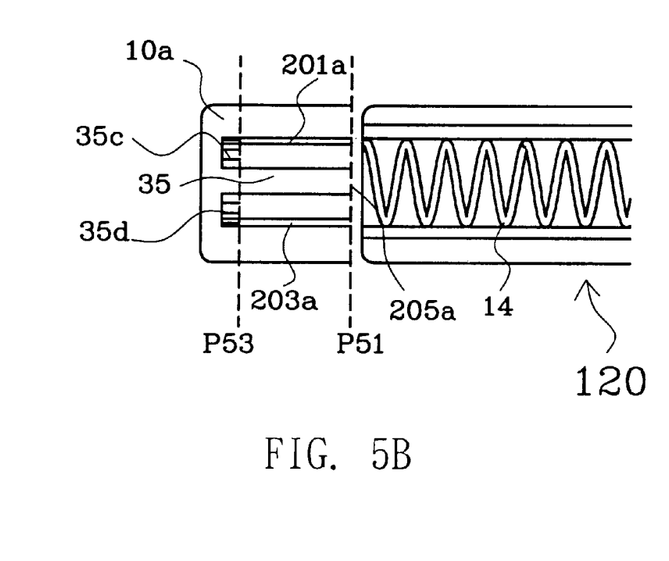
FIG. 5B is a schematic side view of the pintle hub in a released condition.

Referring to FIGS. 5A and 5B, at the release position, the first anchor ridge 201 of the pintle hub 16 is wedged in the first release trough c, and the second anchor ridge 203 is wedged in the second release trough c'. As the anchor ridges 201, 203 of the pintle hub 16 are wedged in the release troughs c, c', one end of the elastic element 14 is located at a second position P51 while the pintle hub 16 is located at a second pintle hub location P53 in the first bushing 10a. Meanwhile the third bushing space 35c and the fourth bushing space 35d at two ends of the axle 35 do not have a gap with the first anchor side 201a and the second anchor side 203b of the pintle hub 16, thus the pintle hub 16 can run through the space without being stopped, and may be released by means of the elastic element 14. And the first bushing 10a may be separated from the barrel 120. As a result, the invention can achieve automatic release function without comprising the exterior design of the device.

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

I claim:

1. An automatic releasing hinge, comprising:

a pintle hub having a pair of anchor ridges;

an elastic element having one end abutting against one end of the pintle hub;

a first bushing having a pair of turning troughs, a pair of anchor troughs and a pair of release troughs formed therein;

wherein another end of the pintle hub abuts against a first inner wall of the first bushing when one of the anchor ridges of the pintle is positioned in one of the turning troughs and the anchor troughs;

wherein said another end of the pintle hub abuts against a second inner wall of the first bushing when one of the anchor ridges of the pintle hub is positioned in the release trough;

a barrel housing the elastic element and the pintle hub, and the barrel being releasably engaged with the first bushing; and the inner wall of the bushing comprising three pairs of opposing humps, and the turning troughs, the anchor troughs and the release troughs are opposingly formed between the humps.

2. The automatic releasing hinge of claim 1, wherein the anchor ridges are jutting outwards from the periphery of the pintle hub.

3. The automatic releasing hinge of claim 1, wherein the first bushing and the barrel are coupled through the pintle hub.

4. The automatic releasing hinge of claim 1, wherein the pintle hub has a center spindle coupled with an axle of the first bushing.

\* \* \* \* \*